Figure 1:
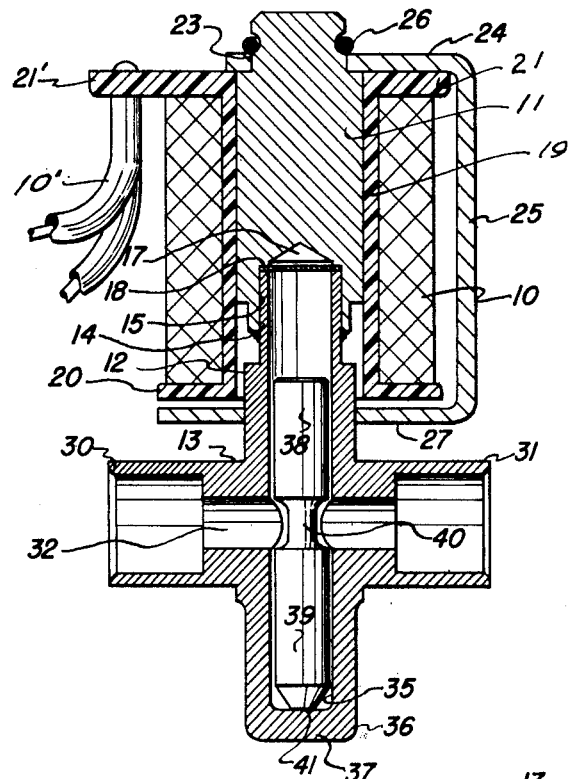

Feb. 3, 1953 F. R. ECK 2,627,544
SOLENOID
Filed Sept. 5, 1947

INVENTOR.
FLOYD R. ECK
BY
*J. D. Douglas*
His ATTORNEY

Patented Feb. 3, 1953

2,627,544

UNITED STATES PATENT OFFICE 2,627,544

SOLENOID

Floyd R. Eck, Des Plaines, Ill., assignor to Admiral Corporation, Chicago, Ill., a corporation of Delaware Application September 5, 1947, Serial No. 772,231

1 Claim. (Cl. 175—338)

This invention relates to solenoids and more particularly to alternating current operated solenoids.

As is well known to those versed in the art, solenoids that are operated by alternating current have a tendency, when energized, to vibrate and be noisy. The most common practice for eliminating the noise heretofor has been to use shading coils, either in the armature or in the stator. The use of a shading coil, although quite satisfactory, increases the manufacturing cost. There are also some structures which do not readily lend themselves to the use of a shading coil. This is particularly true in solenoids having a very small armature or core.

By the present invention, I am able to eliminate the chattering, or vibration, in a solenoid adapted to be energized with alternating current without the use of a shading coil. The invention about to be described will be described in connection with its use in a solenoid operated valve particularly useful in certain forms of refrigeration systems. It will be appreciated, however, that the invention is not limited to such use, and it will be apparent that there are many other places where the invention may be applied.

In certain types of refrigeration systems, it is desirable to restrict or obstruct the flow of refrigerant in certain parts of the circulatory system. It very often happens that the conduits making up such a system may be relatively small, varying in diameter anywhere from ⅛ to ½ inch. Obviously, in small conduits it is not necessary or desirable to have a large valve. Such structures also contemplate the use of a valve construction where the armature actually forms the valve itself. In this type, the mechanical connections common to prior valves are eliminated, with a resultant decrease in moving parts which are subject to wear and lost motion. Furthermore, such integral construction greatly simplifies the manner of making seals, enabling a completely enclosed system to be realized and thus eliminating the leaking joints.

Still other advantages of the invention, and the invention itself, will become more apparent from the following description of an embodiment thereof, which description is illustrated by the accompanying drawings and forms a part of this specification.

Figures 2, 3:
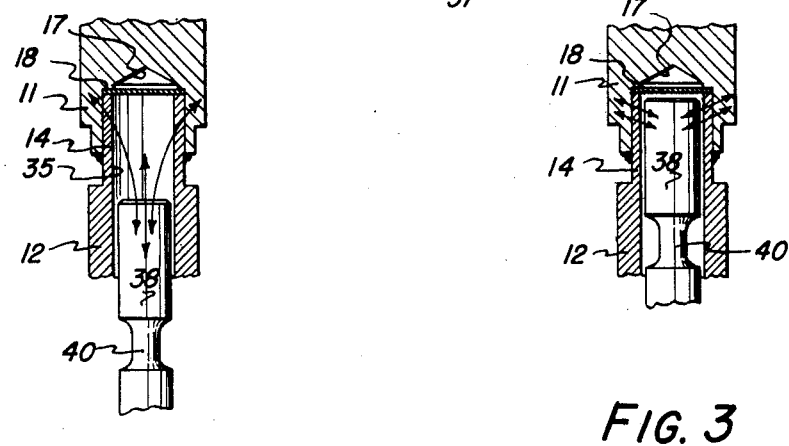

In the drawings:

Fig. 1 is an enlarged vertical medial section view of a solenoid embodying my invention, and Figs. 2 and 3 are fragmentary diagrammatic views for illustrating the principle of operation.

Briefly, the invention contemplates a winding adapted to be energized by alternating current; an iron core extending partially through the winding, a valve body of non-magnetic material having a portion extending into the winding and engaging with the core and an armature or valve plunger which is reciprocable in the valve body and may be attracted into the winding upon energization of the winding. The magnetic flux path is so designed that at the moment of energization of the winding, its greatest effect is endwise of the plunger and in the operated or energized position, the greatest magnetic forces on the armature are in a radial direction.

Referring now to the drawings, throughout which like parts have been designated by like reference characters, and referring particularly first to Fig. 1, the solenoid includes a winding 10 which is wound on a spool of insulating material and it in turn is disposed on the composite core. The core includes the solid portion 11, of soft magnetic iron, and a stem 12 which is an extension of the valve body that is made of non-magnetic material and which stem is provided with an extension 14 of reduced diameter adapted to extend into a bore 15 of the core 11. The inner end of the bore 15 terminates in a tapered or conical wall 17, and the extension 14 abuts a disk 18, also of non-magnetic material such as brass, the opposite side of which closes the bore from the tapered wall 17 to thus leave an open space beyond the disk.

The ends of the winding are engaged by the end flanges 20 and 21 of the spool which is preferably fiber or Bakelite. Preferably, the end flanges are made integral with the core sleeve 19. The end of the spool bearing the flange 20 surrounds the stem 12 of the valve body, and the end bearing the flange 21 surrounds the core 11 and has a part 21' which overhangs the end of the winding and through which the lead wires 10' may extend and be supported. The end of the core 11 is reduced at 23 and one leg 24 of a C-shaped member 25 of magnetic material is disposed over the reduced portion and held in place by a split ring 26. The other leg 27 of the member 25 is disposed around the stem 12 of the valve body. This member may be of magnetic material to furnish a low reluctance path for the magnetic flux and may also be used for supporting the device if desired.

The valve body 13 is generally X shape, the extensions 30 and 31 being bored to provide for a connection with conduits not shown. Either one may comprise an inlet and the other an outlet and each connect to a duct 32 extending through the body. It will be appreciated that extensions may be threaded to provide a threaded coupling if desired, but I have found that in refrigeration systems the provision of smooth surfaces whereby a solder joint can be made with the tubes is most satisfactory for preventing leakage.

The valve, which is adapted to intercept fluid flow through the duct 32, is disposed in a bore 35 which traverses the duct 32 and extends upwardly through the extension 12—14. The bore also extends downward into the part 36, which is closed by the end wall 37. It is a balanced valve and comprises two cylindrical body portions 38 and 39 spaced from each other by the reduced portion 40. The upper part 38 terminates in a substantially flat end, while the lower end 39 is chamfered as indicated at 41.

In Fig. 1, the valve is shown in its open position, the winding 10 being de-energized. At this time, the duct 32 is open and the end of the part 39 rests on the wall 37. When the magnet winding is energized, the valve will rise to the position shown in Fig. 3, at which time the part 39 closes the duct 32.

The operation of the solenoid will best be understood by reference to Figs. 2 and 3. As previously stated, solenoids of this type have a tendency to vibrate and be noisy when energized. This is especially true of prior construction because the plunger has a tendency to contact the core and the alternating flux causes it to hammer against the core, the side motion of the plunger in the core being noticeable. This was because the flux was greatest between the end of the plunger and the core and, mainly, in a longitudinal direction. Furthermore, the action was enhanced in view of the fact that it is customary in valves of this type to provide a relatively loose fit of the plunger in the core.

As best shown in Fig. 2, when the solenoid is first energized, the flux generated is mainly in the direction of the arrows. The member 14—12 being non-magnetic, this flux acts on the plunger, or valve, primarily in a longitudinal direction. This causes the plunger to be drawn upward in the bore 35. When it is drawn up to the position shown in Fig. 3, it will be noted that the greatest flux and resultant attraction at this time is mainly a radial direction. This results in the pull being distributed around the plunger in a radial direction rather than longitudinally, which, since the pull is equally around the plunger, causes the plunger to remain steady and not vibrate. The effect of the endwise pull on the plunger is minimized by the space 17 and the disk 18. Furthermore, the end 39 which is out of the magnetic field has a balancing effect which helps to eliminate the side movement, and although there is a longitudinal vibration, the armature floats freely out of contact with the core. Eddy currents in the disk 18 also cause an out of phase flux of a small magnitude which tends to hold the plunger away from the disk. This as distinguished from the ordinary shading coil which surrounds a part of the core and causes out of phase flux in the core that has an attractive effect on the armature when the rest of the armature is having the least attraction.

The disk 18 thus fulfills two purposes. It limits the distance that the plunger may be pulled upward into the core on the initial energization of the winding. That is the inertia of a plunger, if the disk was not present, would cause it to travel up into the core where the endwise flux, being alternating, would cause it to vibrate. By stopping the plunger with the disk 18, it is stopped at a position where the flux is primarily radial. In addition, out-of-phase currents generated therein which act in opposition to those of the core through the gap 17 minimizing or cancelling the flux from the core at this point and due to the short reluctance path as indicated by the arrows in Fig. 3 actually acting in opposition to the stronger radial flux to have a slight repulsion effect. The foregoing in addition to the balancing effect of the part of the valve not in the field which extends beyond the core.

It will be understood that the theory of operation may be different than as discussed above and that regardless of the theory, the results indicate a materially improved operation.

Making the sleeve part 14 of non-magnetic material prevents sticking of the plunger. It will also be apparent that the thinness of the wall 14 has a tendency to increase the pull on the armature at the time the winding is energized.

Having thus described my invention and explained what I believe to be the correct theory of its operation, I am aware that numerous and extensive departures may be made therefrom without departing from the spirit or scope of my invention. Furthermore, although the invention is disclosed as being embodied in a valve particularly useful for refrigerating systems, it will be appreciated that it is not limited to that particular application but may be used at any place where an alternating current solenoid is desirable.

I claim:

A solenoid comprising a solenoid winding adapted to be energized by alternating current, a core for said solenoid comprising a magnetic portion of soft iron extending into the winding from one end and terminating short of the other end of the winding, said core being formed with a bore in the end disposed in the winding, said bore extending into the core and terminating at substantially the midportion of the winding in a conical end wall, a sleeve of non-magnetic electrically conducting material extending into the winding from the other end and meeting the magnetic core, said sleeve having a portion of reduced diameter extending into the bore in said core to the conical end wall and forming a lining for said core, and a portion of larger diameter and thickness adjacent the open end of the core, a disk of non-magnetic electrically conducting material closing said bore at the conical end wall and held in position by said sleeve and providing an air gap beyond said sleeve wherein the flux density is reduced, a cylindrical plunger of magnetic material of a diameter to slide loosely in said sleeve and adapted to be attracted into said winding and having a portion extending out of said winding when the other part is attracted into the winding and a pole piece having one end connected to one end of the core and extending over the end and alongside the winding and then over the other end of the winding and being disposed around said non-magnetic sleeve.

FLOYD R. ECK.

REFERENCES CITED

The following references are of record in the file of this patent:

UNITED STATES PATENTS

| Number | Name | Date |
|---|---|---|
| 513,111 | Jandus | Jan. 23, 1894 |
| 571,974 | Lean | Nov. 24, 1896 |
| 1,005,855 | Lindquist | Oct. 17, 1911 |
| 1,271,670 | Conrad | July 9, 1918 |
| 1,389,056 | Lane | Aug. 30, 1921 |
| 1,460,517 | Stevens | July 3, 1923 |
| 1,804,462 | Eggleston | May 12, 1931 |
| 1,920,925 | Juchheim et al. | Aug. 1, 1933 |
| 1,930,902 | Meachem | Oct. 17, 1933 |
| 1,961,062 | Mallory | May 29, 1934 |
| 1,965,054 | Powers | July 3, 1934 |
| 2,207,082 | Wetzel | July 9, 1940 |
| 2,239,312 | Berges | Apr. 22, 1941 |
| 2,245,439 | Hull | June 10, 1941 |
| 2,357,959 | Kouyoumjian | Sept. 12, 1944 |
| 2,394,103 | Rader | Feb. 5, 1946 |
| 2,493,386 | Cairns | Jan. 3, 1950 |

FOREIGN PATENTS

| Number | Country | Date |
|---|---|---|
| 18,353 | England | of 1897 |
| 93,102 | Switzerland | Mar. 9, 1915 |
| 151,789 | Austria | Dec. 10, 1937 |

OTHER REFERENCES

Magnets, by C. R. Underhill, pp. 67, 68 and 69, McGraw-Hill Book Co., Inc., N. Y., 1924.

Magnets, by C. R. Underhill, pp. 61, 62, McGraw-Hill Book Co., Inc., New York, 1924.